United States Patent [19]

Salamey

[11] Patent Number: 5,713,728

[45] Date of Patent: Feb. 3, 1998

[54] ELECTROMAGNETIC PUMP WITH PLASTIC COVERED PISTON

[76] Inventor: Laurence R. Salamey, 110 Schoolhouse Rd., Deerfield, N.Y. 13502

[21] Appl. No.: 588,887

[22] Filed: Jan. 19, 1996

[51] Int. Cl.$^6$ ........................................ F04B 17/04
[52] U.S. Cl. ........................ 417/418; 417/417; 92/248
[58] Field of Search ............................ 417/417, 418; 92/248, 170.1

[56] References Cited

U.S. PATENT DOCUMENTS

| | | | |
|---|---|---|---|
| 461,295 | 10/1891 | Van Depoele | 417/418 |
| 1,684,468 | 9/1928 | Brown | 417/418 |
| 2,515,110 | 7/1950 | Bornstein | 417/418 |
| 2,686,280 | 8/1954 | Strong et al. | 417/418 |
| 2,690,128 | 9/1954 | Basilewsky | 417/418 |
| 2,761,392 | 9/1956 | Parker . | |
| 2,862,450 | 12/1958 | McDonnell . | |
| 2,925,814 | 2/1960 | Vibber et al. . | |
| 3,384,021 | 5/1968 | Perron . | |
| 3,740,171 | 6/1973 | Farkos | 417/418 |
| 3,931,554 | 1/1976 | Spentzas . | |
| 4,131,398 | 12/1978 | Rocchitelli | 417/418 |
| 4,210,409 | 7/1980 | Child . | |
| 4,884,954 | 12/1989 | Van Niekerk . | |
| 5,085,563 | 2/1992 | Collins et al. . | |

FOREIGN PATENT DOCUMENTS 547566 10/1921 France .......................... 417/418

Primary Examiner—Timothy Thorpe
Assistant Examiner—Peter G. Korytnyk
Attorney, Agent, or Firm—Spencer & Frank

[57] ABSTRACT

A positive displacement inductive pump includes a housing having first and second ends, and a bore extending from the first end to the second end. A piston is positioned entirely within the bore and defines at least one substantially enclosed displacement chamber. The piston includes a metal rod, and a corrosion resistant lining that completely encapsulates the metal rod. First and second inductive coils are each wrapped around an outer circumference of the housing and are each alternatingly energizable to produce respective first and second induced magnetic fields causing metal piston to move to oppositely located first and second positions within the bore. At least one check valve assembly is attached to one of the first and second ends and is in communication with the at least one displacement chamber. The at least one check valve assembly allows for the respective ingress and egress of a material into and out of the at least one displacement chamber through the check valve assembly and in dependence on a respective directional movement of the piston.

19 Claims, 4 Drawing Sheets

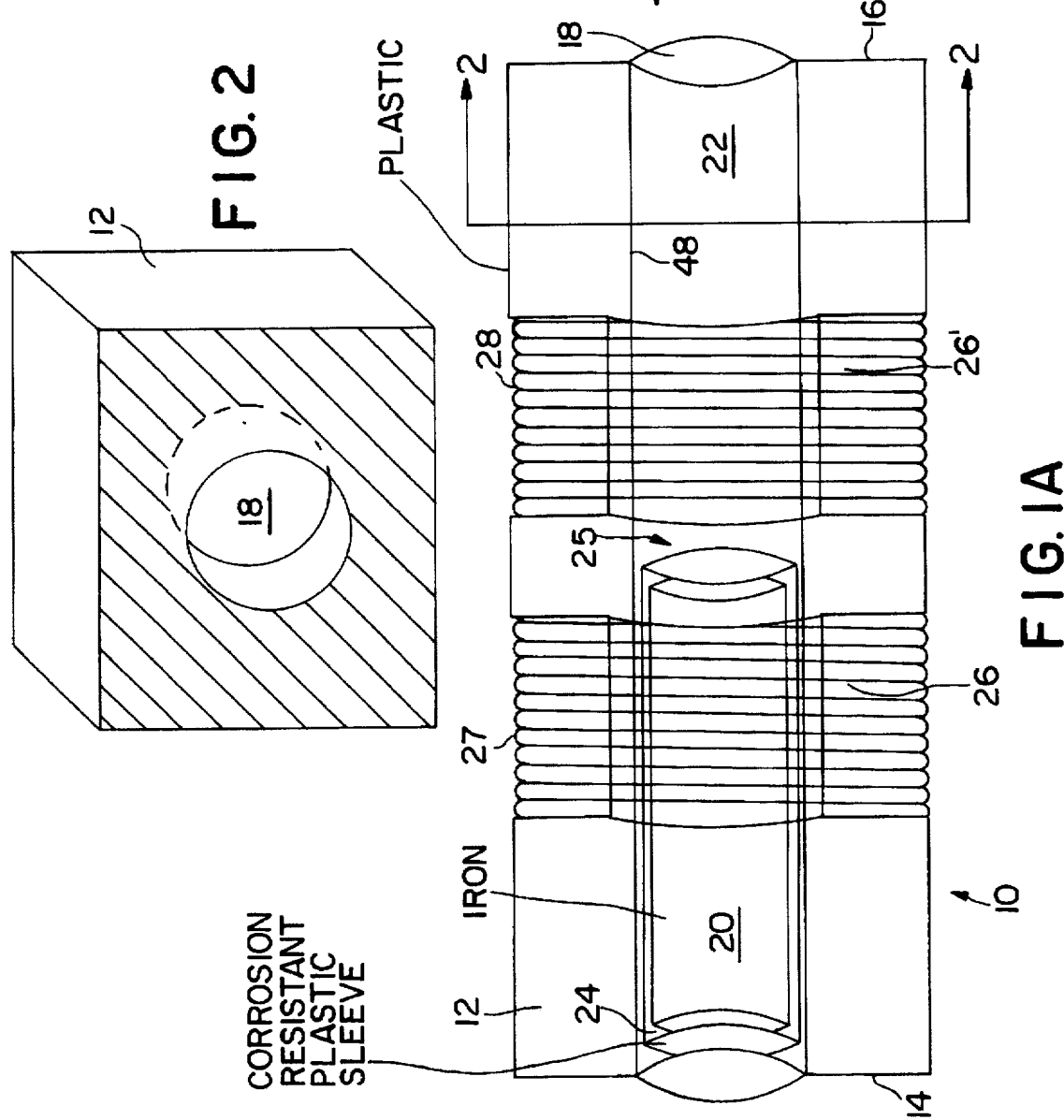

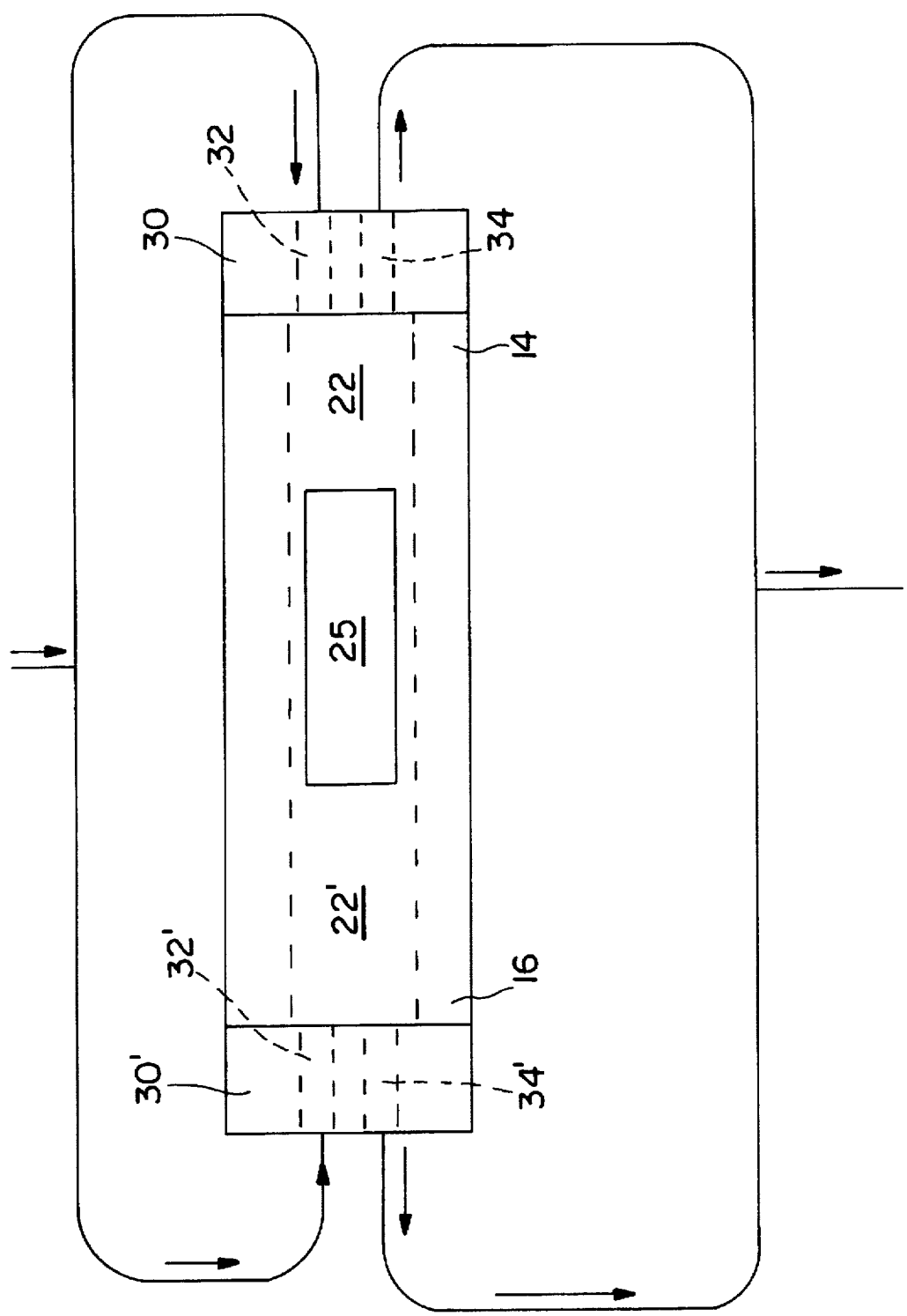

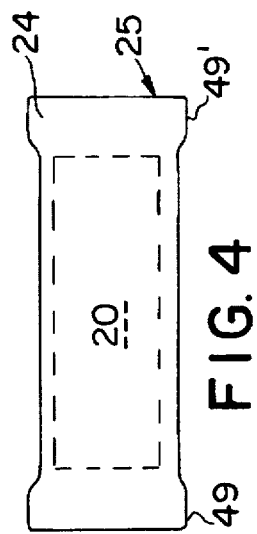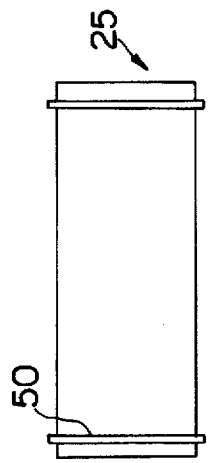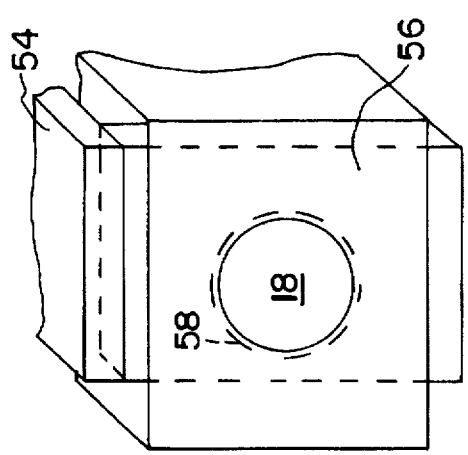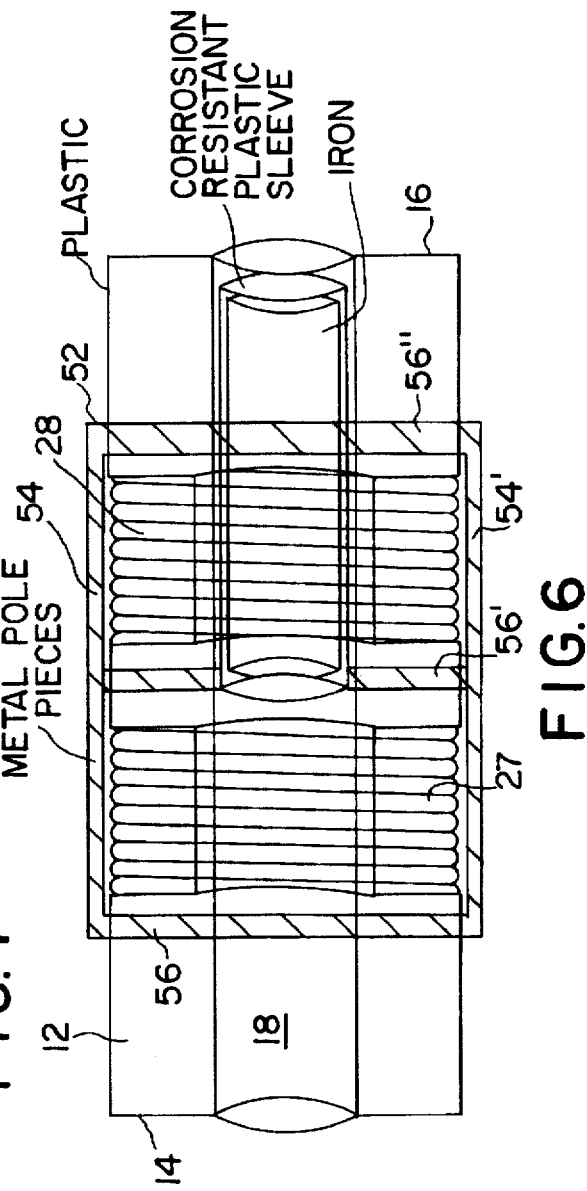

5,713,728

ELECTROMAGNETIC PUMP WITH PLASTIC COVERED PISTON

BACKGROUND OF THE INVENTION

The present invention relates to a positive displacement inductive pump.

Various types of pumps are known that operate on different principles, and that are used for different applications. For example, there are numerous types of plastic impeller pumps, as well as different types of positive displacement pumps.

Most commercially available positive displacement pumps are made of steel and stainless steel. However, stainless steel is known to be subject to corrosion by liquid chlorine, i.e., bleach. Thus, the majority of the commercially available pumps are not suitable for applications where bleach must be pumped, such as in the laundry industry.

One positive displacement pump that can tolerate sodium hypochlorite is a plastic gear pump. However, this type of pump is very expensive, and tends to leak by the gears when in the "off" position. Another type pump is a bladder pump, which has rollers that squeeze an internal bladder. However, as the elasticity of the bladder diminishes, so does the output volume. A third type of pump is a peristaltic pump, where a roller essentially squeezes a piece of tubing. However, similar to the bladder pump, as the elasticity of the tubing diminishes, inaccuracies occur in the volume being delivered.

Typically, the peristaltic pump is the pump most often used in the laundry industry, as this pump is inexpensive and simple to repair. When the volume decreases too much, the tubing is simply replaced. Unfortunately, this results in a great increase in the chemicals used in these pumps.

It is necessary that the pump used in the laundry and other wear-wash applications be self priming. Positive displacement pumps are generally self priming, however, some are not.

Most of these known pumps require some sort of mechanical linkage, such as a shaft, connecting the pumps internal components with a power source, or drive, or other elements located external to the pump. To contain the fluids within the pump, i.e., to prevent the pumped liquid from leaking out around the mechanical linkage, seals are needed. Once these seals wear out, the pump will begin to leak to the outside environment.

SUMMARY OF THE INVENTION

It is an object of the present invention to provide a positive displacement inductive pump that is resistant to corrosion.

It is yet a further object of the present invention to provide a pump that has an accurate displacement, is essentially leak-proof, and is inexpensive to manufacture and maintain.

It is a further object of the present invention to provide an inductive pump that is self priming.

It is another object of the present invention to provide a pump that does not require any seals separating the internal components from the outside environment.

The above and other objects are accomplished according to the invention by the provision of a positive displacement inductive pump that includes a housing which is formed of a corrosion resistant material and has first and second ends, and a bore extending from the first end to the second end. A piston is positioned entirely within the bore and defines at least one displacement chamber at one end of the bore. The piston includes a metal rod, and a corrosion resistant lining that completely encapsulates the metal rod. Means are provided on the circumference of the piston to provide a seal with the inner surface of the housing defining the bore. First and second inductive coils are each wrapped around an outer circumference of the housing and are each alternatingly energizable to produce respective first and second induced magnetic fields causing the piston to move to oppositely located first and second positions within the bore in the manner of a solenoid. At least one check valve is assembly attached to one of the first and second ends and is in communication with the at least one displacement chamber. The at least one check valve assembly allows for the respective ingress and egress of a material into and out of the at least one displacement chamber through the check valve assembly and in dependence on a respective directional movement of the piston.

The piston of the inductive pump according to the invention is comprised of an inner metal core that is encapsulated in a corrosive resistant material, such as a polymer plastic. The core, which is typically rod-shaped, moves within a cylindrical housing in a back and forth motion using induced magnetic fields generated by the two separate coils.

The two separate coils are wound about the outside of the cylindrical housing. The coils are energized in an alternating manner, causing the inner metal core to line up with the respective induced magnetic field. Voltage to the coils is continuously switched between the coils by, for example, a timing device or a current sensing device.

As the voltage is switched between respective coils, the inner metal core is caused to pulsate back and forth, lining up with the respective magnetic field corresponding to the energized coil. Thus, the inner metal core acts as a piston movable within a piston cylinder, causing a net displacement from side to side within the cylindrical housing.

Check valves are placed at one or both ends of the cylindrical housing. Therefore, one end or both ends of the pump may be used to displace liquids, gases, or solids.

The cylindrical housing and/or the core material may be varied to resist attack (such as corrosion) from the outer environment and the medium that is being pumped.

The inductive pump according to the invention enjoys several unique advantages. For example, no seals are required between the mechanical pump components, i.e., between the inner metal core and the displacement chambers. Thus, the coils and the inner metal core are completely isolated from the corrosive material being pumped.

The inductive pump according to the invention is self priming. Thus, the inductive pump is well suited for the laundry industry, and can also be used to distribute chemicals in restaurant dish washing equipment.

Additionally, the inductive pump according to the invention is far more accurate than the other known positive displacement pumps, as previously described, over a greater period of time. There is no dependency upon the elasticity of a material, such as a bladder or tubing, for refilling.

The materials used in the present invention are highly corrosive resistant. The internal components are completely separated from the outside environment. No shaft is necessary, that would otherwise require a seal that would ultimately leak to the outside. When internal parts (such as the lining) wear out, the pump will only leak internally, i.e., around the piston.

Additionally, the present invention does not require a mechanical linkage between the inner metal core and an outside power source. Instead, the magnetic field transgresses the plastic polymer linings and drives the inner encapsulated metal core. As a result, a completely self priming displacement type pump is created that does not require a rotational type motor.

The pumping action created by a pump according to the present invention forms a pulsatile flow. The pulsatile flow may be converted to a more laminar type flow by utilizing both ends of the cylindrical housing. Thus, as one end of the pump is pumping material out, the other end of the pump is filling with the material. As the pumping action reverses, pumping and filling stop for only a fraction of a second.

Preferably, the coils are powered by alternating current, for example, a 110 volt or 220 volt power supply.

There are many possible ways of switching the current from coil to coil. The switching may be at a fixed rate, manually changed, or automatically changed via various sensing devices. For example, a simple timed switching circuit may be used. Alternatively, the timed switching may be variable. Moreover, the switching can be triggered by sensors. For example, a flow sensor can be used that causes the switch to occur when the flow decreases to a certain point. Alternatively, a current sensor may be used. As the current through the coil decreases as a result of decreased work load when the inner metal core finally lines up with the induced magnetic filed, the current sensor causes the switch to occur when the current decreases to a certain point.

The materials used in the cylindrical body and inner metal core may be varied to achieve maximum wear and corrosive resistance depending upon the application.

If desired, seals and/or bearing materials may be placed at either end of the inner metal core, or the core may be machined to create its own seal with the chamber wall, thus reducing flow from one chamber to the other.

In a preferred embodiment, a steel frame surrounds the bore of the housing and provides a pole arrangement for the coils. That is, the steel frame is used to maintain a pathway or circuit for the magnetic field through and around the outside of the coils, and through the piston.

Typically, the steel frame comprises three rectangular shaped steel pieces each embedded within the housing and extending therethrough, so that two opposite ends or edge surfaces of each piece project from the housing wall. Further, each rectangular piece has a bore therethrough, and each piece is arranged perpendicular to an axis along which the piston moves.

The three projecting edges or ends of the embedded steel pieces on each respective side of the housing are interconnected together by additional rectangular pieces of steel, so that the five total pieces of steel form the interconnected steel frame.

The three embedded steel pieces maintain the magnetic field throughout the cycle of the piston. By doing so, the force of the piston is likewise maintained. Further, it is advantageous to arrange two of the embedded pieces of steel as close to the end of the respective coils as possible, because the piston will attempt to center itself in the center of the energized coil, and the end of the piston will attempt to align itself with the edge of the embedded piece of steel located adjacent to the respective coil.

Preferably, the length of the piston should not be less than the distance between two adjacent embedded pieces of steel, and is preferably not more than twice this distance. If the piston is longer than the distance between two adjacent embedded pieces of steel, and hence longer than one coil, one end of the piston will attempt to align itself with the edge of one piece of steel, while the other embedded piece of steel will align itself at any position along the length of the piston, completing the magnetic field without loss of force. However, if the piston is over sized, opposing forces may be generated, and if the piston is undersized, the desired maximum force would never be achieved.

Additionally, the placement of the embedded pieces of steel on opposite sides of the coil will cause the piston to tend to center itself, which reduces wear along the piston's surface. If the pieces of steel were only on one side of the coil, the piston would tend to pull much harder along that side's surface, causing uneven wear and increased friction.

The pump according to the invention is resistant to corrosion, and will tolerate strong acids and alkalies, as well as 12.5% sodium hypochlorite (bleach).

The pump is not made with exotic materials. Instead, the materials used are readily available. Thus, the cost of production is relatively low, making this pump very marketable.

Apart from the laundry industry, there are many other applications, i.e, laboratory, chemical production, that would benefit from the high degree of accuracy this pump can provide.

The invention will be described below in greater detail in connection with embodiments thereof that are illustrated in the drawing figures.

BRIEF DESCRIPTION OF THE DRAWINGS

FIGS. 1a and 1b illustrate an inductive pump according to a first embodiment of the invention.

FIG. 2 is a sectional view of the inductive pump housing taken along section line 2—2 from FIG. 1.

FIG. 3 illustrates a second embodiment of the inductive pump according to the invention, along with a schematic illustration of the flow pattern of a pumped material to and from the pump.

FIGS. 4 and 5 illustrate two different configurations of the piston of the inductive pump.

FIGS. 6 and 7 illustrate a preferred embodiment of an inductive pump according to the invention having a frame.

DETAILED DESCRIPTION OF THE INVENTION

Figure 8:
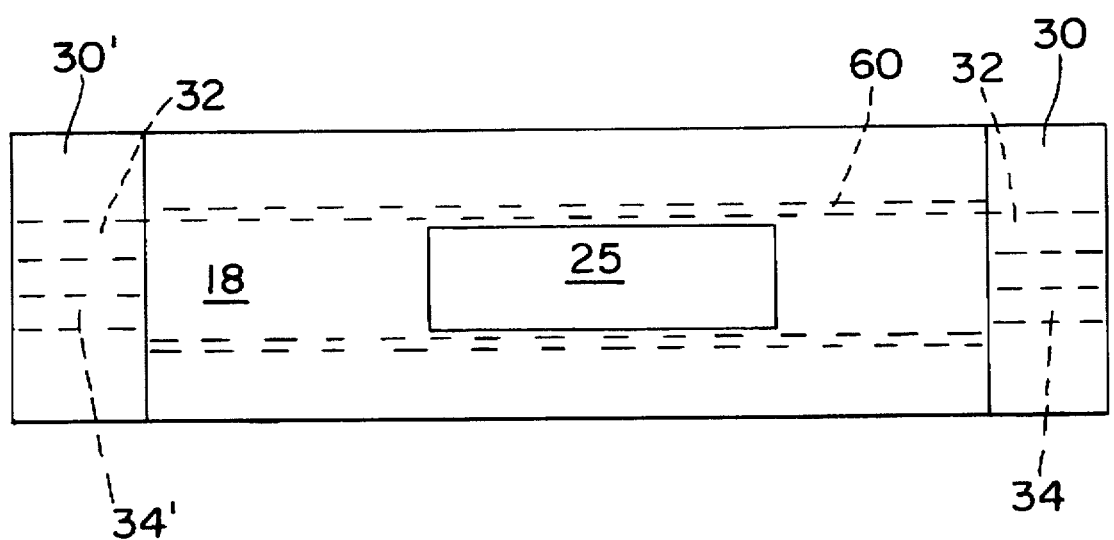
FIG. 8 illustrates an embodiment of an inductive pump according to the invention having a removable sleeve.

Referring to FIGS. 1–2, an inductive pump 10 is illustrated, with the inductive pump 10 including a housing 12 having a first end 14, and a second end 16. A bore 18 extends along the longitudinal axis of the housing 12 from the first end 14 to the second end 16.

A metal rod 20 of a length less than that of the bore 18 is positioned entirely within the bore 18 and defines at least one displacement chamber 22 adjacent one end of the housing. Typically, the metal rod 20 is comprised of pig iron, and has a consistent diameter along substantially its entire length. Of course, other types of ferro magnetic and special steels may also be used, such as silicon steel.

A corrosion resistant lining 24 completely encapsulates the metal rod 20. Preferably, the lining 24 is comprised of the same material as the housing, such as a polymer plastic, for example, a vinyl ester resin. Corrosion resistant lining 24 and metal rod 20 together form a movable piston 25.

Preferably, housing 12 includes two circumferentially arranged channels 26, 26' formed in an outer surface thereof.

First and second inductive coils 27, 28 are each wrapped around an outer circumference of the housing 12. In particular, the first inductive coil 27 is received within one of the channels, and the second inductive coil 28 is received within the other of the channels. Further, the first inductive coil 27 is located at a distance, about one and one-half inches in a preferred embodiment for use in the laundry industry, away from the first end of the housing, and the second inductive coil 28 is located at a similar, preferably the same, distance away from the second end of the housing. The inductive coils 27 and 28 are each alternatingly energizable in a known manner to produce respective first and second induced magnetic fields causing the piston 25 to move to oppositely located first and second positions within the bore 18.

Referring also to FIG. 1b, at least one check valve 30 is attached to one of the first and second ends 14, 16, and is in communication with the at least one displacement chamber 22. The check valve assembly 30 allows for the respective ingress and egress of a material into and out of the displacement chamber 22 through the check valve assembly 30, and in dependence on a respective directional movement of the piston 25. The check valve assembly 30 includes at least two flow passageways, 32, 34, each allowing for the unidirectional flow of the pumped material.

Check valve assembly 30 may be attached to housing 12 in a variety of ways. For example, the check valve assembly may be removably attached to the housing using screws or bolts, not shown. Alternatively, the check valve assembly can be welded or otherwise permanently fixed to the housing. If a check valve assembly is provided at only one end of the housing, then the other end should preferably be closed off in some manner, for example, a plate fastened to the other end of the housing.

When first inductive coil 27 is energized, the resulting induced magnetic field pulls the metal rod 20 in a direction of arrow 36. This creates a vacuum in the displacement chamber 22, causing the pumped material to be drawn into the displacement chamber through passageway 32. Once the displacement chamber 22 is filled, the first inductive coil 27 is deenergized, and the second inductive coil is energized, so that the metal rod 20 is pulled in a direction of arrow 38. This causes the material within displacement chamber 22 to be discharged through flow passageway 34.

Typically, each stroke of the piston delivers a fixed volume of material, that can be dispensed in a continuous stroke with a high degree of accuracy, or dispensed in increments, by limiting the duration of current flow.

Check valve assembly 30 may comprise, for example, a respective sphere 40, 42, held in place within the respective flow passageway using a respective coil spring 44, 46 to provide a pair of individual check valves. Thus, when the metal rod 20 is pulled in a direction of arrow 36, the vacuum in the displacement chamber 22 overcomes the force of coil spring 44, allowing the pumped material to be drawn into the displacement chamber around sphere 40 and through passageway 32. However, simultaneous with this action, sphere 42 is urged in a direction of arrow 36, to seal flow passageway 34.

When the first inductive coil 27 is deenergized, and the second inductive coil is energized, the positive displacement of the material within the displacement chamber 22 overcomes the force of coil spring 46, causing the pumped material to be pumped out of the displacement chamber around sphere 42 and through passageway 34. Simultaneous with this action, sphere 40 is urged in a direction of arrow 38, to seal flow passageway 32. Thus, each flow passageway will allow the flow of material in only one direction. Further, check valves may help to prevent siphoning of the liquid being pumped, i.e., the valves allow the pumping only when the piston 25 is moving in a forward direction, and prevent siphoning when the piston 25 is moving in a reverse direction as long as the siphoning pressure does not exceed the force of the spring 44, 46 on the respective sphere.

The components of check valve assembly 30 need not be limited to the aforementioned sphere and spring configuration. Instead, any form of check valve may be used, such as a flapper valve, that will allow a unidirectional flow of material.

Referring also to FIG. 3, a second embodiment of the present invention is illustrated. In this embodiment, the piston partially defines an additional substantially enclosed displacement chamber 22' at the opposite end of the bore 18. First and second check valve assemblies 30, 30' are each attached to the respective first end 14 and second end 16 of the housing 12. Each check valve assembly 30, 30', is in communication with a respective displacement chamber, and operates in the manner previously described. The first check valve assembly 30 allows for the respective ingress and egress of the material through the first check valve assembly 30, and into and out of displacement chamber 22 simultaneous with the respective egress and ingress of the material through the second check valve assembly 30', and out of and into the displacement chamber 22'. Thus, when the material is pumped out of displacement chamber 22 through flow passageway 34, material is simultaneously drawn into displacement chamber 22' through flow passageway 32'. Conversely, when the material is pumped out of displacement chamber 22' through flow passageway 34', material is simultaneously drawn into displacement chamber 22 through flow passageway 32. In this manner, a continuous, laminar type flow can be maintained.

To prevent the flow of material around the piston 25, the corrosion resistant lining can be manufactured so that it sealingly engages a housing wall 48 defining the bore 18, as illustrated in FIG. 1a and FIG. 4. In this embodiment, the corrosion resistant lining typically has a thickness, in the preferred embodiment, of about one-sixteenth of an inch in a region of the metal rod 20. However, preferably the corrosion resistant lining 24 extends beyond each end of the metal rod, for example, by one-half inch, to define two oppositely located extended regions 49, 49' each having a diameter essentially corresponding to a diameter of the bore 18 of the housing 12. Further, in a region of the metal rod, the corrosion resistant lining has a diameter less than the diameter of the extended regions 49,49'. In this manner, the extended regions 49, 49' are in sealing engagement with the housing wall 48 defining the bore. Thus, should the mid region of the housing be warped due, for example, to the manufacturing technique used or as a result of use, the piston 25 will still form an effective seal with the housing wall 48.

Alternatively, as shown in FIG. 5, at least one seal 50, preferably two as shown, can be attached to the surface of the piston so as to engage with the housing wall 48.

In a preferred embodiment, and as shown in FIGS. 6 and 7, the inductive pump further comprises a steel frame 52 that surrounds at least a portion of the bore 18 of the housing 12, and that at least in part is preferably embedded within housing 12. Typically, the steel frame comprises two oppositely located metal pieces 54, 54' each extending parallel to the axis of the bore 18 and disposed on the surface of the housing, which preferably is rectangular in cross section.

Further, the frame 52 includes three metal pieces 56, 56', and 56", that are generally symmetrically arranged with respect to the coils to extend essentially perpendicular to the bore 18, and thus to the oppositely located metal pieces 54, 54', and that extend through the and are embedded in the housing 12. The three protruding edges or end surfaces of the three metal pieces 56, 56', and 56" are connected to the two oppositely located metal pieces 54, 54'.

Typically, all of the metal pieces of the frame 52 are rectangular shaped steel plates or bars. Additionally, the two oppositely located metal pieces 54, 54' are arranged to superpose the first and second inductive coils, 27, 28, each of which is disposed between a respective two of the metal pieces 56, 56' and 56". In such an arrangement, it has been found to be advantageous to form the piston with a length greater than a distance between any adjacent two of the three additional metal pieces 56, 56' 56".

To allow for the passage of the piston, the three metal pieces 56, 56' and 56" have a bore 58 therethrough that is coaxially arranged with the bore 18 of the housing. So as to completely separate the surface of the bore 58 from the piston, the bores of the three additional metal pieces should have a diameter greater than a diameter of the bore 18 of the housing. In particular, the diameter of the bores 58 is generally, for example, about one and three-sixteenth inches, and the diameter of the bore 18 is generally about one inch in the preferred embodiment mentioned above.

To increase the pressure or volume flow delivered, several inductive pumps can be connected together in parallel, to share a common output orifice (not shown). If the output orifice is reduced in size, the pressure and velocity will increase, while the volume remains constant. Alternatively, the arrangement can be such that the pressure remains constant, so as to increase the volume flow rate.

The inductive pump according to the invention can also be used for medical purposes, such as in a dialysis machine to deliver dialysis fluid. As shown in FIG. 8, a modified inductive pump suitable for such purpose has a sleeve 60 that is located in bore 18, with piston 25 located within the sleeve. Thus, when inserted, sleeve 60 defines the bore in which piston 25 is located. Sleeve 60 is removable, so that after use, the sleeve can be removed from bore 18 and discarded. Piston 25 could then be sterilized and reused, and a new, sterile sleeve 60 could be inserted into the bore 18, so as to provide a sterile assembly. Check valves 30, 30' could be reused by sterilizing, or discarded and replaced with new sterile check valves.

The invention now being fully described, it will be apparent to one of ordinary skill in the art that any changes and modifications can be made thereto without departing from the spirit or scope of the invention as set forth herein.

What is claimed:

1. A positive displacement inductive pump, comprising:

a housing formed of a non-magnetic corrosion resistant material, having first and second ends, and a bore extending from the first end to the second end;

a piston positioned entirely within the bore and being of a length less than that of the bore to define at least one displacement chamber adjacent one of said ends of said housing, said piston comprising a rod formed of a magnetic material, and a corrosion resistant lining completely encapsulating said metal rod;

means disposed on the outer circumferential surface of said piston, for providing a seal between the outer surface of said piston and the inner surface of said housing defining said bore;

first and second inductive coils each wrapped around a respective portion of the outer circumference of said housing and each being alternatingly energizable to produce respective first and second induced magnetic fields causing said piston to move to oppositely located first and second positions within the bore;

a steel frame forming pole pieces for said coils and surrounding at least a portion of the bore of said housing, said steel frame comprising three metal pieces generally symmetrically arranged with respect to said first and second coils and extending into said housing essentially perpendicular to a longitudinal axes of bore, and two additional said oppositely located metal pieces extending between said three metal pieces and connected to outer edges thereof; and, at least one check valve assembly attached to one of the first and second ends and in communication with the at least one displacement chamber to close the associated end of said bore, said at least one check valve assembly allowing for the respective ingress and egress of a material into and out of the at least one displacement chamber through said check valve assembly and in dependence on a respective directional movement of said piston.

2. The positive displacement inductive pump defined in claim 1, wherein said corrosion resistant lining comprises said means for providing a seal.

3. The positive displacement inductive pump defined in claim 2, wherein said piston has a consistent diameter along substantially its entire length and is of substantially the same diameter as said bore.

4. The positive displacement inductive pump defined in claim 1, wherein said corrosion resistant lining comprises a polymer plastic.

5. The positive displacement inductive pump defined in claim 1, wherein said coils are positioned in substantially the center of the length of the housing so that said piston defines a respective displacement chamber adjacent each end of said housing, and wherein said at least one check valve comprises first and second check assemblies each attached to a respective one of the first and second ends of said housing to close the respective end and each in communication with a respective one displacement chamber, said first check valve assembly allowing for the respective ingress and egress of the material into and out of one displacement chamber through said first check valve assembly simultaneous with the respective egress and ingress of the material out of and into the other displacement chamber through said second check valve assembly.

6. The positive displacement inductive pump defined in claim 1, wherein said means for providing a seal comprises at least one seal disposed on the outer circumferential surface of said piston and in engagement with said inner wall of said housing.

7. The positive displacement inductive pump defined in claim 1, wherein: said housing is rectangular; said three metal pieces are rectangular shaped steel plates; and each of said three metal pieces has a bore therethrough that is coaxially arranged with the bore of said housing.

8. The positive displacement inductive pump defined in claim 7, wherein said piston has a length greater than a distance between any adjacent two of said three additional metal pieces.

9. The positive displacement inductive pump defined in claim 7, wherein the bores of said three metal pieces have a diameter greater than a diameter of the bore of said housing.

10. The positive displacement inductive pump defined in claim 7, wherein said three metal pieces of said steel frame are embedded within said housing.

11. The positive displacement inductive pump defined in claim 10, wherein said housing has two circumferentially arranged channels formed in an outer surface thereof, said first inductive coil is disposed within one of the channels, and said second inductive coil is disposed within the outer of the channels; and, each of said two additional metal pieces of said frame is disposed on a respective outer surface of said housing.

12. The positive displacement inductive pump defined in claim 1, wherein said metal rod comprises pig iron.

13. A positive displacement inductive pump, comprising:

a housing formed of a non-magnetic corrosion resistant material, having first and second ends, and a bore extending from the first end to the second end;

a piston positioned entirely within the bore and being of a length less than that of the bore to define at least one displacement chamber adjacent one of said ends of said housing, said piston comprising a rod formed of a magnetic material, and a corrosion resistant lining completely encapsulating said metal rod;

means disposed on the outer circumferential surface of said piston, for providing a seal between the outer surface of said piston and the inner surface of said housing defining said bore, said corrosion resistant lining extending beyond each end of said metal rod to define two oppositely located extended regions each having a diameter essentially corresponding to a diameter of the bore of said housing, so that said extended regions form said means for providing a seal, with said corrosion resistant lining having a diameter in a region of said metal rod which is less than the diameter of said extended regions;

first and second inductive coils each wrapped around a respective portion of the outer circumference of said housing and each being alternatingly energizable to produce respective first and second induced magnetic fields causing said piston to move to oppositely located first and second positions within the bore; and at least one check valve assemblies attached to one of the first and second ends and in communication with the at least one displacement chamber to close the associated end of said bore, said at least one check valve assembly allowing for the respective ingress and egress of a material into and out of the at least one displacement chamber through said check valve assembly and in dependence on a respective directional movement of said piston.

14. The positive displacement inductive pump defined in claim 13, further comprising a steel frame forming pole pieces for said coils and surrounding at least a portion of the bore of said housing.

15. The positive displacement inductive pump defined in claim 13, wherein said housing comprises a polymer plastic.

16. The positive displacement inductive pump defined in claim 13, wherein said corrosion resistant lining comprises a polymer plastic.

17. The positive displacement inductive pump defined in claim 13, wherein said corrosion resistant lining and said housing are each comprised of the same material.

18. The positive displacement inductive pump defined in claim 13, wherein said housing has two circumferentially arranged channels formed in an outer surface thereof, said first inductive coil is disposed within one of the channels, and said second inductive coil is disposed within the other of the channels.

19. The positive displacement inductive pump defined in claim 13, further comprising a removable sleeve located within said bore, and surrounding the outer surface of said piston.

* * * * *